United States Patent [19]
Potter et al.

[11] Patent Number: 6,157,393
[45] Date of Patent: Dec. 5, 2000

[54] APPARATUS AND METHOD OF DIRECTING GRAPHICAL DATA TO A DISPLAY DEVICE

[75] Inventors: Michael Potter; Clifford A. Whitmore, both of Huntsville, Ala.

[73] Assignee: Intergraph Corporation, Huntsville, Ala.

[21] Appl. No.: 09/354,462

[22] Filed: Jul. 15, 1999

Related U.S. Application Data

[60] Provisional application No. 60/093,247, Jul. 17, 1998, and provisional application No. 60/107,232, Nov. 5, 1998.

[51] Int. Cl.$^7$ .................................................. G06F 15/80
[52] U.S. Cl. ........................................ 345/505; 345/506
[58] Field of Search .................................. 345/501–506, 345/213, 507–509, 521, 519

[56] References Cited

U.S. PATENT DOCUMENTS

| | | | |
|---|---|---|---|
| 4,434,437 | 2/1984 | Strolle et al. | 358/140 |
| 4,615,013 | 9/1986 | Yan et al. | 364/521 |
| 4,646,232 | 2/1987 | Chang et al. | 364/200 |

(List continued on next page.)

FOREIGN PATENT DOCUMENTS

| | | |
|---|---|---|
| 0 311 798 A2 | 4/1989 | European Pat. Off. . |
| 0 397 180 A2 | 11/1990 | European Pat. Off. . |
| 0 438 194 A2 | 7/1991 | European Pat. Off. . |
| 0 448 286 A2 | 9/1991 | European Pat. Off. . |
| 0 463 700 A2 | 1/1992 | European Pat. Off. . |
| 0 566 229 A2 | 10/1993 | European Pat. Off. . |
| 0 627 682 A1 | 12/1994 | European Pat. Off. . |
| 0 631 252 A2 | 12/1994 | European Pat. Off. . |
| 0 693 737 A2 | 1/1996 | European Pat. Off. . |
| 0 734 008 A1 | 9/1996 | European Pat. Off. . |
| 0 735 463 A2 | 10/1996 | European Pat. Off. . |
| 0 810 553 A2 | 12/1997 | European Pat. Off. . |
| 0 817 009 A2 | 1/1998 | European Pat. Off. . |
| 0 825 550 A2 | 2/1998 | European Pat. Off. . |
| 0 840 279 A2 | 5/1998 | European Pat. Off. . |
| WO 86/07646 | 12/1986 | WIPO . |
| WO 92/00570 | 1/1992 | WIPO . |
| WO 93/06553 | 4/1993 | WIPO . |
| WO 97/21192 | 6/1997 | WIPO . |

OTHER PUBLICATIONS

"A Fine Grained Data Flow Machine and Its Concurrent Execution Mechanism," Iwashita et al., C&C Information Technology Research Labs, Apr. 1989, pp. 63–72.

"A Dataflow Image Processing System TIP–4," Fujita et al., C&C Information Technology Research Labs, NEC Corporation, Sep. 1989, pp. 735–741.

"Processing the New World of Interactive Media," Rathnam, The Trimedia VLIW CPU Architecture, Mar. 1998, pp. 108–117.

"Effective Cache Mechanism for Texture Mapping," IBM Technical Disclosure Bulletin, vol. 39, No. 12, Dec. 1996, pp. 213–217.

(List continued on next page.)

*Primary Examiner*—Kee M. Tung

[57] ABSTRACT

An apparatus for and method of directing graphical data toward a display device from a plurality of graphics processors couples the graphics processors in a manner that reduces the size of the interface on each graphics processor. In particular, each graphics processor produces graphical data for an associated set of pixels on the display device, where each pixel is represented by a first amount of graphical data. The graphics processors are arranged so that one of the graphics processors is a destination processor. The total number of graphics processors that are not designated as the destination processor thus constitute a remaining number. Each graphics processor produces a second amount of graphical data during each clock cycle of a common clock. The first amount of graphical data, however, is comprised of at least substantially two times the second amount of graphical data. The graphics processors then are coupled so that during each clock cycle, the destination processor receives no more graphical data from the other processors than an amount equal to the product of the remaining number and the second amount.

51 Claims, 7 Drawing Sheets

U.S. PATENT DOCUMENTS

| | | | |
|---|---|---|---|
| 4,908,780 | 3/1990 | Priem et al. | 364/521 |
| 4,918,626 | 4/1990 | Watkins et al. | 364/522 |
| 4,991,122 | 2/1991 | Sanders | 364/521 |
| 5,107,415 | 4/1992 | Sato et al. | 395/800 |
| 5,123,085 | 6/1992 | Wells et al. | 395/121 |
| 5,239,654 | 8/1993 | Ing-Simmons et al. | 395/800 |
| 5,287,438 | 2/1994 | Kelleher | 395/132 |
| 5,293,480 | 3/1994 | Miller et al. | 395/163 |
| 5,313,551 | 5/1994 | Labrousse et al. | 395/425 |
| 5,363,475 | 11/1994 | Baker et al. | 395/122 |
| 5,371,840 | 12/1994 | Fischer et al. | 395/133 |
| 5,394,524 | 2/1995 | DiNicola et al. | 395/163 |
| 5,398,328 | 3/1995 | Weber et al. | 395/500 |
| 5,446,479 | 8/1995 | Thompson et al. | 345/139 |
| 5,485,559 | 1/1996 | Sakaibara et al. | 395/133 |
| 5,511,165 | 4/1996 | Brady et al. | 395/200.01 |
| 5,519,823 | 5/1996 | Barkans | 395/143 |
| 5,544,294 | 8/1996 | Cho et al. | 395/141 |
| 5,555,359 | 9/1996 | Choi et al. | 395/141 |
| 5,557,734 | 9/1996 | Wilson | 395/162 |
| 5,561,749 | 10/1996 | Schroeder | 395/120 |
| 5,572,713 | 11/1996 | Weber et al. | 395/500 |
| 5,631,693 | 5/1997 | Wunderlich et al. | 348/7 |
| 5,664,114 | 9/1997 | Krech, jr. et al. | 395/200.64 |
| 5,666,520 | 9/1997 | Fujita et al. | 345/513 |
| 5,684,939 | 11/1997 | Foran et al. | 395/131 |
| 5,701,365 | 12/1997 | Harrington et al. | 382/212 |
| 5,706,481 | 1/1998 | Hannah et al. | 395/519 |
| 5,721,812 | 2/1998 | Mochizuki | 395/110 |
| 5,737,455 | 4/1998 | Harrington et al. | 382/284 |
| 5,757,375 | 5/1998 | Kawase | 345/429 |
| 5,757,385 | 5/1998 | Narayanaswami et al. | 345/505 |
| 5,764,237 | 6/1998 | Kaneko | 345/430 |
| 5,821,950 | 10/1998 | Rentschler et al. | 345/505 |
| 5,841,444 | 11/1998 | Mun et al. | 345/506 |
| 5,870,567 | 2/1999 | Hausauer et al. | 395/281 |
| 5,883,641 | 3/1999 | Krech, Jr. et al. | 345/505 |
| 5,914,711 | 6/1999 | Mangerson et al. | 345/203 |
| 6,008,821 | 12/1999 | Bright et al. | 345/504 |

OTHER PUBLICATIONS

"Advanced Raster Graphics Architecture," XP–002118066, pp. 890–893.

"Data–Format Conversion: Intel/Non–Intel," vol. 33, No. 1A, Jun. 1990, IBM Technical Disclosure Bulletin, pp. 420–427.

"Address Munging Support in a Memory Controller/PCI Host Bridge for the PowerPC 603 CPU Operating in 32–Bit Data Mode," IBM Technical Disclosure Bulletin, vol. 38, No. 09, Sep. 1995, pp. 237–240.

"One Frame Ahead: Frame Buffer Management for Animation and Real–Time Graphics," XP–000749898, Auel et al., Tektronix Inc., pp. 43–50.

"Efficient Alias–Free Rendering Using Bit–Masks and Look–Up Tables," Abram et al., The University of North Carolina at Chapel Hill, XP–002115680, Jul. 1985, pp. 53–59.

"A New Simple and Efficient Antialiasing with Subpixel Masks," Schilling et al., Computer Graphics, vol. 25, No. 4, Jul. 1991, pp. 133–141.

"A Multiprocessor System Utilizing Enhanced DSP's for Image Progressing," Ueda et al., XP 2028756, pp. 611–619.

"The Reyes Image Rendering Architecture," Cook et al., Computer Graphics, vol. 21, No. 4, Jul. 1987, pp. 95–102.

"The Accumulation Buffer: Hardware Support for High–Quality Rendering," Haeberli et al., Computer Graphics, vol. 24, No. 4, Aug. 1990, pp. 309–318.

"Advanced Animation and Rendering Techniques," Watt et al., ACM Press, New York, New York, pp. 127–137.

The A–Buffer, an Antialiased Hidden Surface Method, Carpenter, Loren, Computer Graphics, vol. 18, No. 3, Jul. 1984, pp. 13–18.

and Method of directing graphical data to a display device

PRIORITY

This application claims priority from United States provisional patent application Ser. No. 60/093,247, filed Jul. 17, 1998, entitled "MULTI-PROCESSOR GRAPHICS ACCELERATOR", the disclosure of which is incorporated herein, in its entirety, by reference. This application also claims priority from United States provisional patent application Ser. No. 60/107,232, filed Nov. 5, 1998, entitled "BACK END SYSTEM FOR MULTIPROCESSOR GRAPHICS ACCELERATOR", the disclosure of which is incorporated herein, in its entirety, by reference.

FIELD OF THE INVENTION

The invention generally relates to computer graphics processing and, more particularly, the invention relates to graphics accelerators having parallel processors.

BACKGROUND OF THE INVENTION

Graphics processors commonly include parallel processors for improving processing speed. In some prior art systems, each parallel processor processes data for a relatively large preselected contiguous portion of a display device. For example, in a four parallel processor graphics accelerator, each processor may produce pixel data for one quadrant of the display device. Accordingly, when an image to be drawn is substantially within one of the quadrants of the display, only one processor is processing while the other processors remain relatively dormant. This can significantly slow system speed, thus decreasing system efficiency.

To display a graphical image, data produced by each parallel processor must be transmitted to the display device. To that end, many prior art systems require that each parallel processor transmit pixel data to a single collection point (e.g., a part of the display device or some intermediate data collection device). Typical single collection points have an interface that can receive the data from each processor. In many such systems, the interface has a dedicated connection to each parallel processor. For example, in an eight processor system that produces twenty-four bits of data per clock cycle, the single collection point interface must have 192 pins to receive the data (i.e., the sum of the output of all the processors per clock cycle). Requiring such a large number of pins, however, undesirably requires a relatively large surface area, increases the cost and complexity of the interface, and decreases system efficiency.

SUMMARY OF THE INVENTION

In accordance with one aspect of the invention, an apparatus for and method of directing graphical data toward a display device from a plurality of graphics processors couples the graphics processors in a manner that reduces the size of the interface on each graphics processor. In particular, each graphics processor produces graphical data for an associated set of pixels on the display device, where each pixel is represented by a first amount of graphical data. The graphics processors are arranged so that one of the graphics processors is a destination processor. The total number of graphics processors that are not designated as the destination processor thus constitute a remaining number. Each graphics processor produces a second amount of graphical data during each clock cycle of a common clock. The first amount of graphical data, however, is comprised of at least substantially two times the second amount of graphical data. The graphics processors then are coupled so that during each clock cycle, the destination processor receives no more graphical data from the other processors than an amount equal to the product of the remaining number and the second amount.

In preferred embodiments, the first amount of graphical data is a multiple of the second amount of graphical data. The first amount may be an odd number, while the second amount may be calculated by rounding up the quotient of the first amount divided by two. Alternatively, the second amount may be a rounded up half of an intermediate amount between the first amount and the second amount. For example, the intermediate amount may be a rounded up half of the first amount. The second amount correspondingly may be a rounded up half of the intermediate amount. In other embodiments, the second amount is a rounded up half of one of a plurality of intermediate amounts between the first amount and the second amount.

In some embodiments, the remaining number of graphics processors equals three, and the first amount of graphical data is twenty-six bits wide. In other embodiments, the remaining number of graphics processors equals seven. The first amount of graphical data may include color information and transparency data.

Data completely representing a set number of pixels may be received by the destination processor after every selected number of clock cycles. In such case, the set number of pixels may equal the remaining number. In another embodiment, a given graphics processor transmits given graphical data toward the destination processor, wherein the given graphical data includes graphical data for a pixel in a set of pixels that is not associated with the given graphics processor.

The apparatus and method also may include a buffer that buffers all pixel data received by the destination graphics processor. All complete pixel data then may be forwarded from the buffer to the display device. In preferred embodiments, the graphics processors include rasterizers. In some embodiments, only fractional amounts of graphical data for pixels are received by the destination processor during each clock cycle. The destination processor may receive fractional amounts of graphical data for a total number of pixels equaling the remaining number.

In accordance with another aspect of the invention, a graphics accelerator for directing graphical data toward a display device includes a plurality of graphics processors that are coupled in a manner that reduces the pin count on each graphics processor. More particularly, each graphics processor has an associated set of pixels on the display device for which they respectively produce graphical data. Each set of pixels has no pixels that are members of the other sets of pixels. In a manner similar to the previously discussed aspect of the invention, each pixel is represented by a first amount of graphical data. Accordingly, the graphics accelerator includes a processor designator that designates one of the graphics processors to be a designation processor, where the total number of graphics processors that are not designated as the designation processor equals a "remaining number." The graphics accelerator further includes a controller and a data transmitter. The controller causes each graphics processor to produce a second amount of graphical data during each clock cycle of a common clock, where the first amount of graphical data is comprised of at least two of the second amounts of graphical data. The data transmitter causes the destination processor to receive (during each clock cycle) no more graphical data than an amount equal to the product of the remaining number and the second amount.

In preferred embodiments, the graphics accelerator further comprises a buffer that stores graphical data received by the destination processor, and a transmitter that transmits graphical data from the buffer to the display device. Only fractional amounts of graphical data for pixels preferably are received by the destination processor during each clock cycle In some embodiments, the destination processor receives fractional graphical data, during each clock cycle, for a number of graphics processors equaling the remaining number.

In accordance with other aspects of the invention, a graphics accelerator for processing graphical data for display on a display device having a plurality of pixels also is configured to reduce the number of pins. To that end, the graphics accelerator includes a fixed number of graphics processors operating in accord with a common clock frequency. Each graphics processor has an associated set of pixels on the display device for which they respectively graphical data, and produces a second amount of graphical data during each clock cycle. One of the graphics processors is designated a destination processor to receive graphical data from the other graphics processors. The graphics accelerator further includes coupling circuitry that couples the plurality of processors in a manner that causes the destination processor to receive (during each clock cycle) no more graphical data from the other graphics processors than an amount equal to the product of the second amount and one less than the fixed number. Only fractional amounts of graphical data for pixels are received by the destination processor during each clock cycle. In preferred embodiments, a first amount of data that is used to represent each pixel comprises at least substantially two times the second amount of data.

In alternative embodiments, each graphics processor includes first and second graphical data ports that each interface with the graphical data either transmitted to or received from other graphics processors. The second graphical data port has a size that is equal to or less than the second amount of data. The first graphical data port has a size that is substantially two times the size of the second graphical data port. Each graphics processor may include a third graphical data port that interfaces with graphical data either transmitted to or received from the other graphics processors. The third graphical data port preferably has a size that is substantially two times the size of the first graphical data port. The third graphical data port on the destination processor preferably receives graphics data for twice as many pixels as it receives on its first graphical data port.

In accordance with yet other aspects of the invention, a graphics processor that processes graphical data for display on a display device includes a state input that receives state data identifying the number of other graphics processors being utilized with the graphics processor, a pixel processor that produces a second amount of graphical data during each clock cycle of a reference clock, and first and second graphical data ports that each interface with graphical data either transmitted to or received from other graphics processors when in a multiple state. The second graphical data port has a size that is equal to or less than the second amount of graphical data. The first graphical data port has a size that is substantially two times the size of the second graphical data port.

The graphics processor is considered to operate in a single state when the state data indicates that the graphics processor is operating with no other graphics processors. Conversely, the graphics processor is considered to be operating in the prior noted multiple state when the state data indicates that the graphics processor is operating with at least one other graphics processor. A first amount of graphical data (representing each pixel) preferably is comprised of two times the second amount of graphical data when the graphics processor is operating in the multiple state.

In other embodiments, the graphics processor further includes a timing input that receives the timing signal from a reference clock. The reference clock may be either internal or external to the graphics processor. In other embodiments, the graphics processor further includes a third graphical data port that interfaces with graphical data either transmitted to or received from other graphics processors when in the multiple state. The third graphical data port preferably is substantially two times the size of the first graphical data port. For example, the third graphical data port is twenty-six bits wide, the first graphical data port is thirteen bits wide, and the second graphical data port is seven bits wide. Accordingly, the second graphical data port is a rounded up half of the size of the first graphical data port (i.e., thirteen divided by two).

In alternative embodiments, the first graphical data port has a first set of pins, and the second graphical data port has a second set of pins with no common pins to the first set. The first set of pins has substantially two times more pins than in the second set of pins. In other embodiments, the graphics processor has a graphical data output for transmitting graphical data to the display device, where the graphical data has the first amount of data for each pixel being illuminated.

When in the multiple state, only fractional amounts of graphical data for pixels are received by the processor from other processors during each clock cycle. The first graphical data port may interface graphical data for two times as many pixels as is interfaced by the second graphical data port.

In accordance with still other aspects of the invention, a graphics processor that processes graphical data for display on a display device with a plurality of pixels includes a state module that maintains the state of the graphics processor, a pixel processor that produces a fractional amount of graphical pixel data during each clock cycle of a reference clock when in a multiple state, and a plurality of graphical data ports that each interface with corresponding graphical data ports on other graphics processors when in the multiple state. The graphics processor is considered to operate in a single state when operating with no other graphics processors. Conversely, the graphics processor is considered to be operating in the prior noted multiple state when operating with at least one other graphics processor. Each of the plurality of graphical data ports has a different size and each interfaces fractional amounts of graphical data only. The fractional data is received during each clock cycle.

In preferred embodiments, the fractional amount of graphical pixel data is the same size as a first of the plurality of graphical data ports. The first graphical data port interfaces fractional pixel data for one pixel during each clock cycle. A second of the plurality of graphical data ports is included that is substantially twice as large as the first of the plurality of graphical data ports. The second of the plurality of graphical data ports interfaces fractional pixel data for two pixels on the display device during each clock cycle. A third of the plurality of graphical data ports also may be included that is substantially twice as large as the second of the plurality of graphical data ports. The third of the plurality of graphical data ports interfaces fractional pixel data for four pixels on the display device during each clock cycle.

In some embodiments, the graphics processor has a data output port for directing graphical pixel data to a display device. The data output port preferably operates at a frequency that is greater than the frequency produced by the reference clock. For example, the data output port may operate at a frequency that is about two times the frequency produced by the reference clock.

Some embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
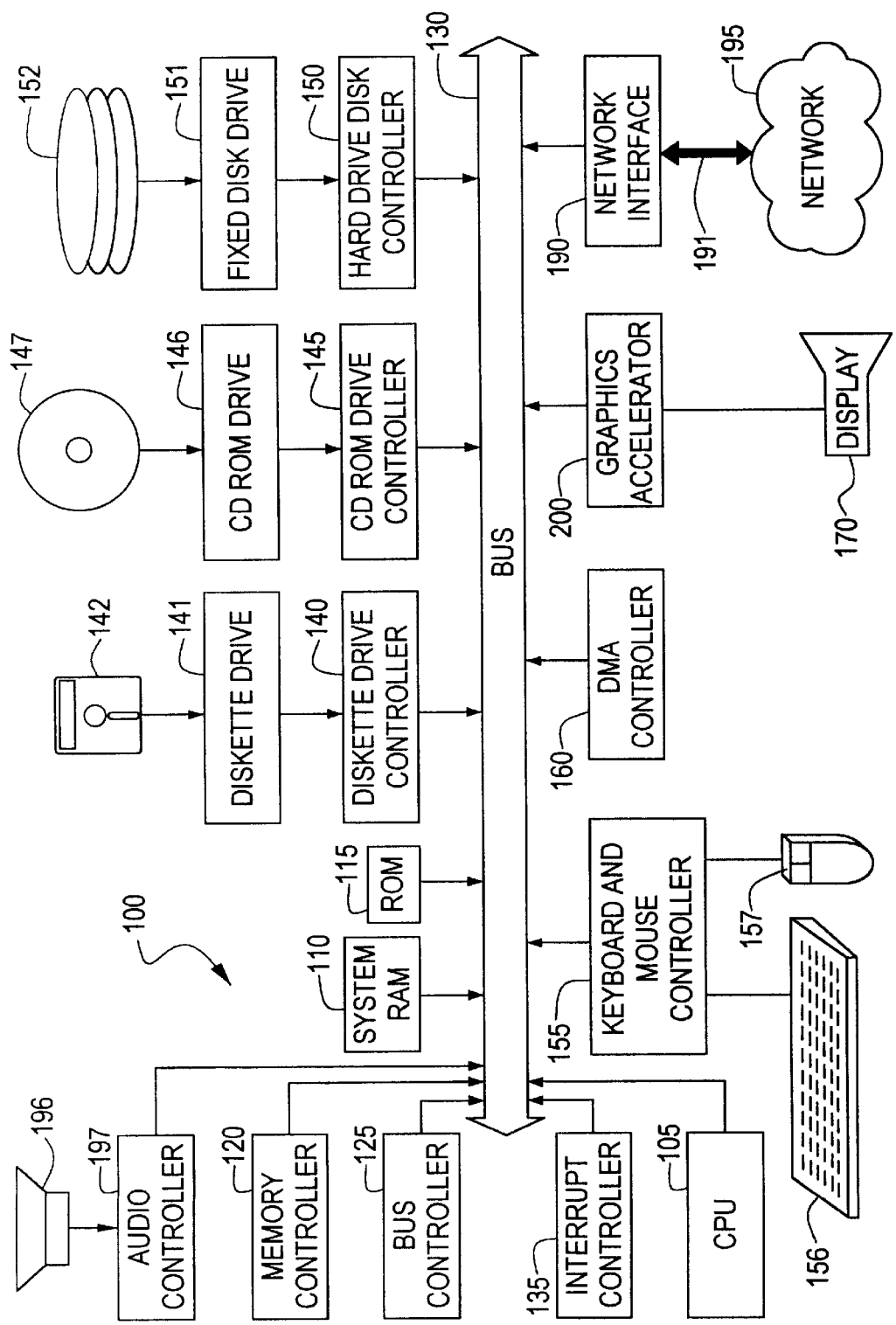
FIG. 1 schematically shows the system architecture of an exemplary computer system on which preferred embodiments of the invention may be implemented.

FIG. 1 illustrates the system architecture for an exemplary computer system 100, such as an Intergraph EXTREME-Z™ graphics workstation (distributed by Intergraph Corporation of Huntsville, Ala.), on which the disclosed method and apparatus for directing graphical data toward a display device 170 may be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 130 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a graphics accelerator 200 (discussed in detail below) that controls the display device 170. The display device 170 preferably is a conventional horizontal scan cathode ray tube ("CRT") monitor having a plurality of pixels. The pixels are arranged in a two-dimensional X-Y grid and are selectively lit, as directed by the graphics accelerator 200, for displaying an image. The display device 170 may be, for example, an IBM G72 General Series Monitor, distributed by International Business Machines Corporation of Armonk, N.Y.

A network adapter 190 also may be included that enables the computer system 100 to connect to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Wa.). Among other computer system control functions, the operating system controls allocation of system resources and performs tasks such as process scheduling, memory management, networking, and I/O services.

Figure 2A:
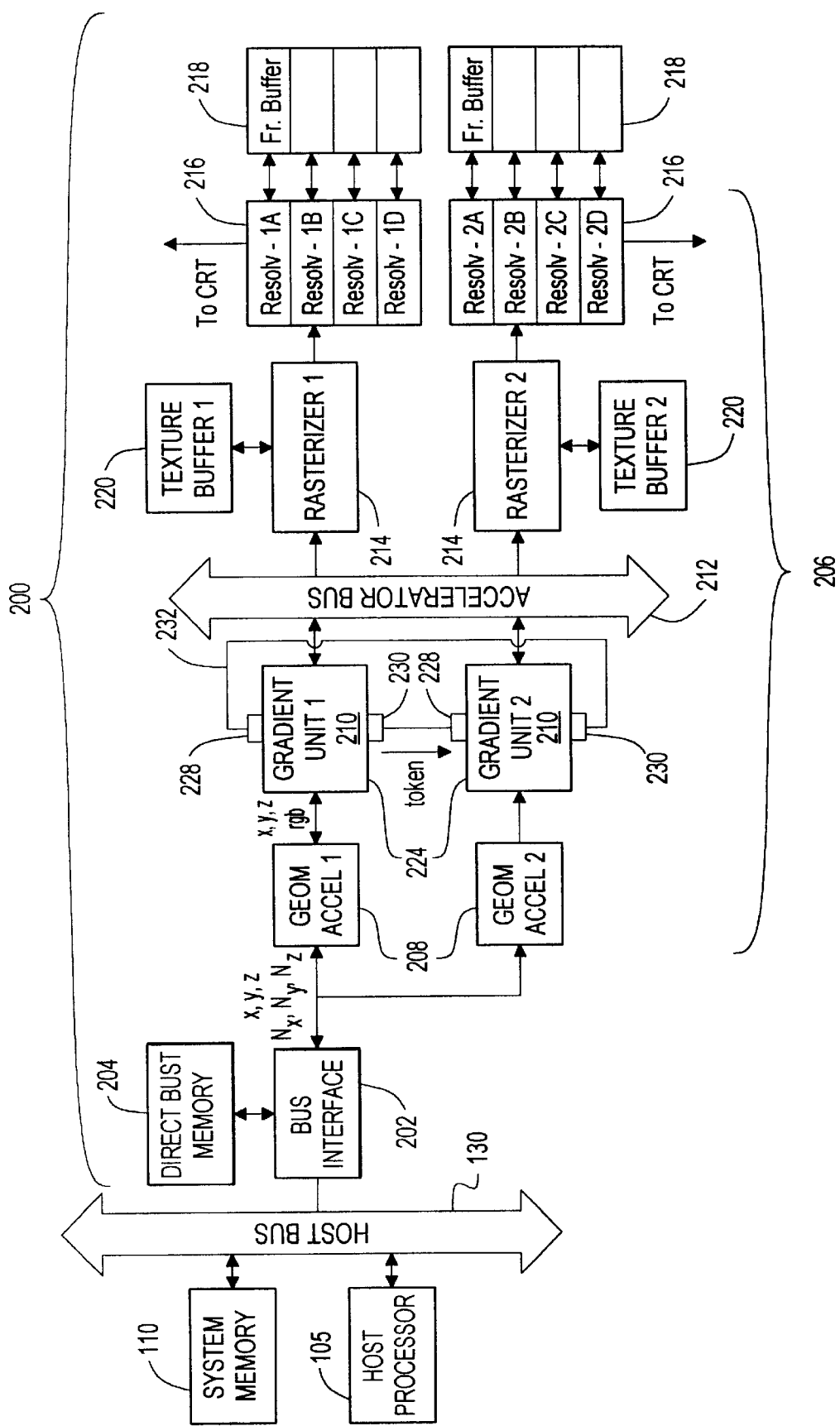
FIG. 2A schematically shows a graphics accelerator having a plurality of parallel graphical data processing units configured in accordance with preferred embodiments of the invention.
Figure 2B:
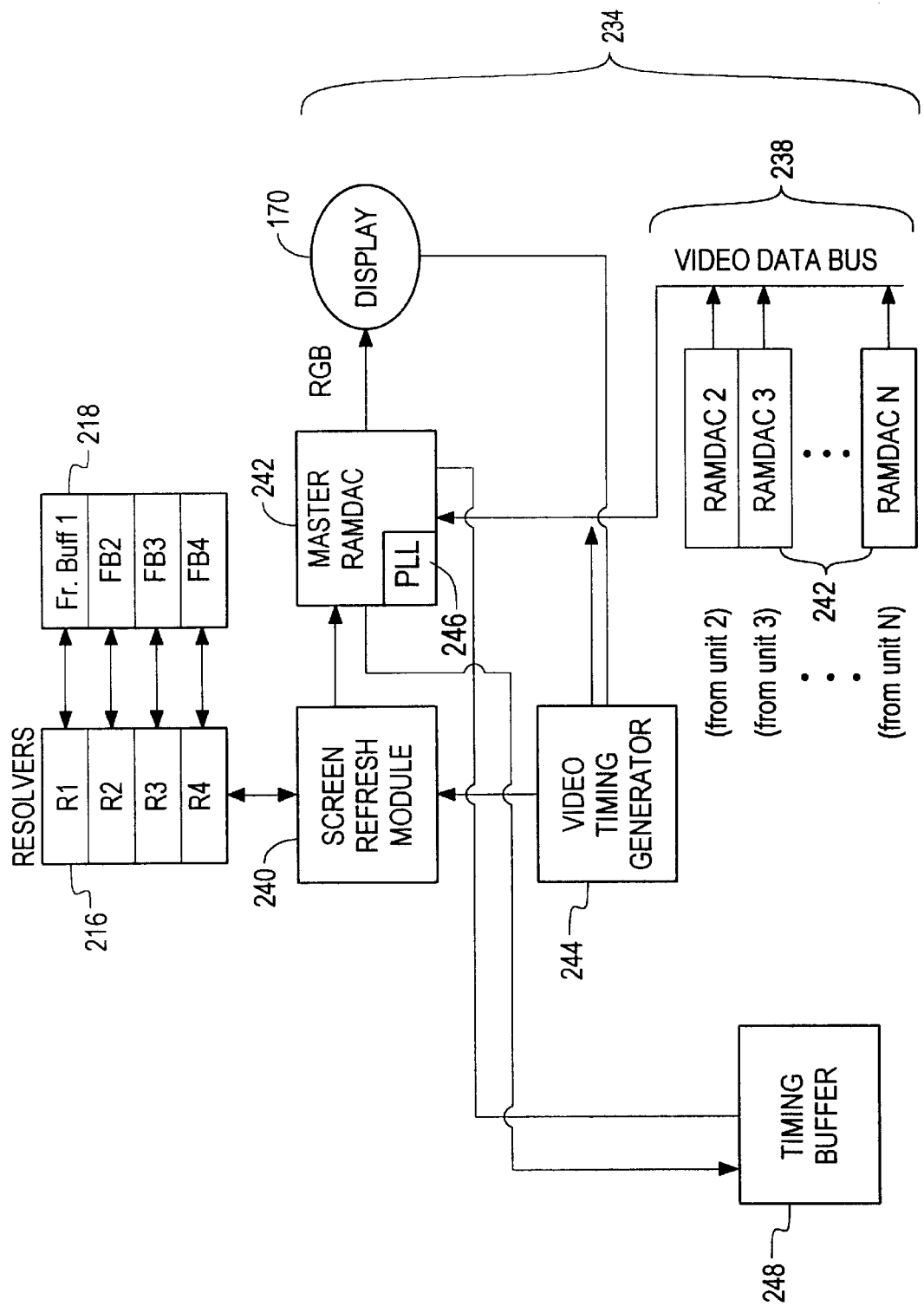
FIG. 2B schematically shows a preferred embodiment of a back end module for retrieving graphical data from a frame buffer and displaying such graphical data on a display device.

FIGS. 2A and 2B schematically show the graphics accelerator 200 configured in accordance with preferred embodiments of the invention. The exemplary graphics accelerator 200 in FIGS. 2A and 2B has two geometry accelerators (described below) and two post geometry accelerator processors (i.e., two rasterizer/gradient unit pairs, discussed below, referred to herein as attribute processors 314). Of course, because two of each type of processor are discussed for simplicity, it should be apparent to those skilled in the art that additional or fewer processors may be utilized. As noted above, the graphics accelerator 200 preferably includes a plurality of parallel processing units that divide the graphics processing in an efficient manner among processors.

The graphics accelerator 200 preferably includes a bus interface 202 for interfacing with the system bus 130, memory 204 (e.g., DIRECT BURST MEMORY™) for temporarily storing graphics request streams received from the host processor 105, and the plurality of processing units for processing the graphics request stream. In preferred embodiments, the memory 204 is in the form of "write combining memory", commonly defined and utilized by Intel microprocessors (e.g., PENTIUM II™ central processing units), available from Intel Corporation of Santa Clara, Calif. Such memory 204 preferably is configured to receive graphics request stream data in bursts directly from the CPU. See, for example, U.S. patent application entitled "Method and System for Transporting Information to a Graphic Accelerator Card", filed on Jun. 30, 1999, and assigned attorney docket number 1247/A33 for more details on the use of memory 204, the disclosure of which is incorporated herein, in its entirety, by reference.

The plurality of processing units preferably processes three dimensional ("3D") graphical images as a plurality of individual triangles defined in 3D space. As known in the art, this method of processing 3D graphical images is known as "tessellation." The plurality of processing units receives incoming triangle vertex data and, based upon such vertex data, ultimately draws each triangle on the display device 170. The incoming vertex data for a given vertex preferably includes the X, Y, and Z coordinate data for the given vertex (identifying the location of the vertex in 3D space), and three directional vector components ("normal vectors") that are perpendicular to the surface of the triangle at that given vertex.

Accordingly, the plurality of processors preferably includes a plurality of parallel geometry accelerators 208 that each receive the incoming triangle vertex data from the bus interface 202 and, based upon such incoming data, calculate attribute data (e.g., color data, depth data, transparency data, intensity data, coordinates of the vertices on the display device 170, etc.) for each of the vertices in the triangle. In preferred embodiments, the state of each geometry accelerator 208 is preconfigured with previously received state data received from the host. When in a given state, a given geometry accelerator processes the incoming data to produce the vertex attributes in accord with the preconfigured state. For example, mathematical models of various images (e.g., a golf ball) and light sources may be stored within memory of the geometry accelerators 208. Such models may be retrieved and utilized to produce the vertex attribute data upon receipt of state data setting the state of the geometry accelerators 208. The state of a given geometry accelerator 208 may be changed upon receipt of new state data that correspondingly changes the state of the given geometry accelerator 208.

Once calculated by the geometry accelerators 208, the vertex attribute data is transmitted to the attribute processors 314 (discussed above). More particularly, the vertex attribute data is forwarded to a plurality of parallel gradient producing units 210 that each calculate gradient data for each triangle. In general terms, gradient data indicates the rate of change of attributes for each pixel in a triangle as a function of the location of each pixel in the triangle. In preferred embodiments, the gradient data is in the form of mathematical derivatives. The gradient data and attribute data then are broadcasted, via an accelerator bus 212, to a plurality of parallel rasterizers 214. Each rasterizer 214 calculates pixel attribute data for select pixels within a triangle based upon the vertex attribute data and the gradient data. A plurality of resolvers 216 then stores the resultant attribute data for each pixel in one of a plurality of frame buffers 218. A texture buffer 220 also may be included for performing texture operations.

Figure 2C:
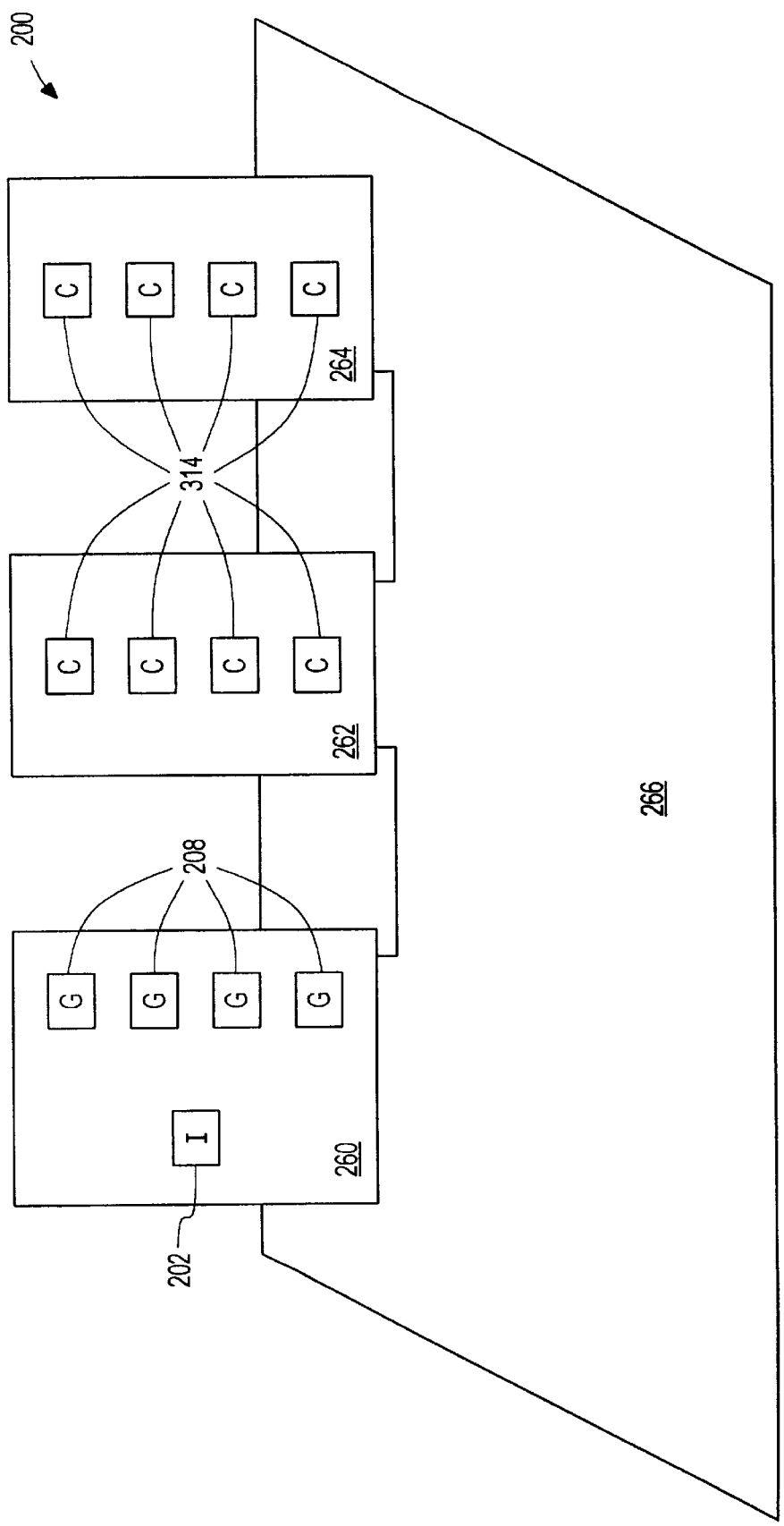
FIG. 2C schematically shows a graphics accelerator card having multiple graphics processors for processing a graphical image in accord with preferred embodiments of the invention.

As suggested above, preferred embodiments of the invention include eight each of the geometry accelerators 208, gradient producing units 210, rasterizers 214, resolvers 216, and frame buffers 218. Each of these elements preferably is coupled to a circuit board to form a single graphics card (i.e., graphics accelerator 200). FIG. 2C shows an exemplary graphics accelerator card having one interface 202, four geometry accelerators 208, and eight attribute processors 314. In preferred embodiments, the interface 202 and four geometry accelerators 208 are coupled to a first card 260, four attribute processors 314 are coupled to a second card 262, and four additional attribute processors 314 are coupled to a third card 264. Each of the first, second, and third cards 260, 262, and 264 plug into a parent card 266 to form the graphics accelerator 200.

Alternative embodiments utilize different numbers of each of the elements. Among other methods, the various elements communicate via a peer-to-peer token passing configuration, the accelerator bus 212, and a video data bus. In preferred embodiments, each attribute processor 314 produces pixel attribute data for a set of pixels of the display device 170. None of the sets of pixels, however, has a pixel that is within another one of the sets of pixels.

Each frame buffer 218 preferably is a double-buffered, sixteen megabyte frame buffer 218 having a back buffer and a front buffer. Accordingly, the contents of the front buffer is displayed by the display device 170 while the resolver 216 is writing to the back buffer. Conventional buffer swaps enable the contents of the back buffer to be displayed. To effectuate this, each rasterizer 214 (with its associated resolvers 216 and frame buffers 218) includes an associated back end unit 234 for removing frame buffer information and displaying it on the display device 170. In preferred embodiments, each attribute processor 314 includes its own dedicated back end unit 234.

FIG. 2B schematically shows a preferred set of back end units 234 for displaying frame buffer information on the display device 170. The set of back end units 234 includes a master back end unit 236 and a plurality of slave back end units 238. Among other things, the master back end unit 236 includes a screen refresh module 240 for retrieving digital frame buffer data from its associated frame buffer 218 via the associated resolvers 216, a master RAMDAC 242 (random access memory digital to analog converter) for performing gamma correction, digital to analog conversion, and synchronization timing functions, and a video timing generator 244 for generating timing signals for each of the aforementioned master back end unit 236 elements and the display device 170. The master RAMDAC 242 preferably includes a phase locked loop 246 for creating a timing signal that is transmitted to a timing buffer 248 memory on the graphics accelerator 200. The timing buffer 248 is coupled with each of the back end units for delivering synchronized timing signals to each of the slave units 238. The cooperation of each of these elements is discussed in greater detail below with reference to FIG. 4.

Each of the slave back end units 238 similarly includes a screen refresh module 240, a RAMDAC 242, and video timing generator 244. The RAMDAC 242 of each slave unit 238 preferably is coupled to the master RAMDAC 242. This coupling may be either via a direct input into the master RAMDAC 242, via a single video bus, or serially via other slave RAMDACs 242. As discussed below, in preferred embodiments, only the video timing generator 244 of the master back end unit 236 is coupled with the display device 170. The video timing generator 244 of the slave units 238, however, are not coupled with the display device 170. Each screen refresh module 240 is coupled to its associated set of resolvers 216 for retrieving data from its associated frame buffer 218. Only one set of resolvers 216, however, is shown in FIG. 2B. That set of resolvers 216 is associated with the master back end unit 236.

Figure 4:
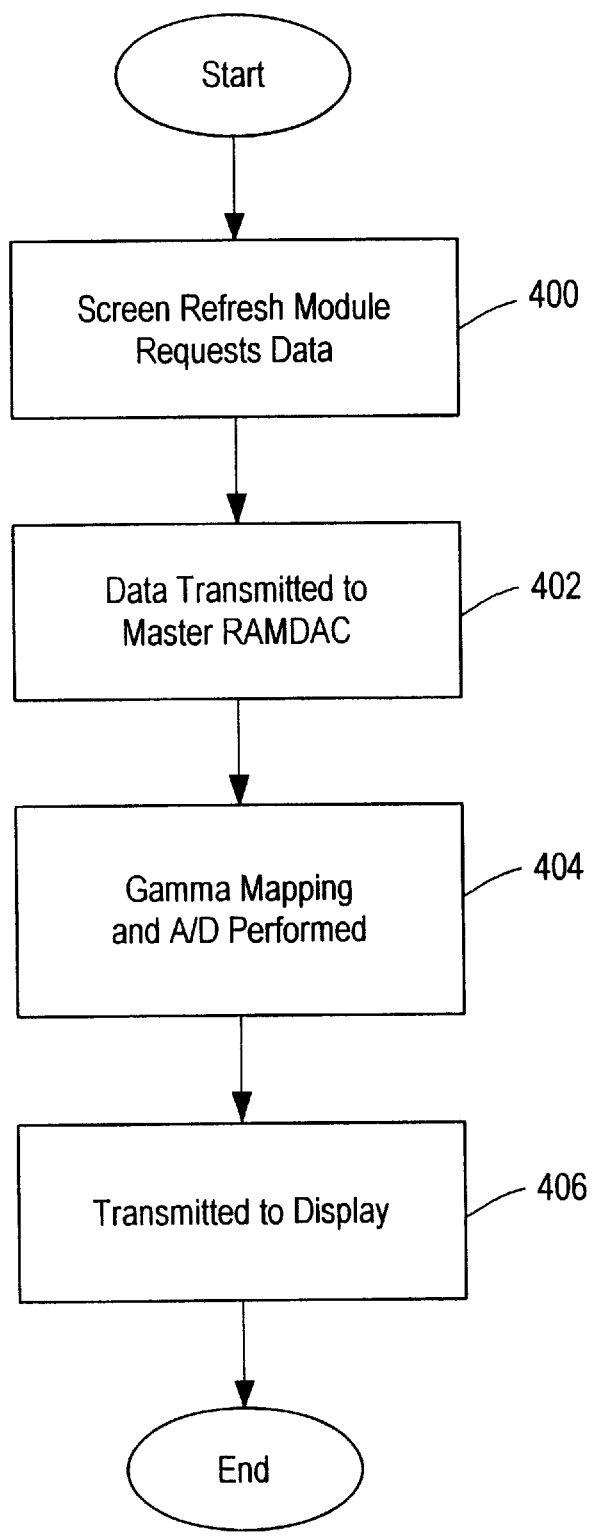
FIG. 4 shows a preferred process utilized by the back end module shown in FIG. 2B for retrieving graphical data from the frame buffer and displaying such graphical data on a display device.

FIG. 4 shows a preferred generalized process utilized by the back end units 234 shown in FIG. 2B for retrieving graphical data from each of the frame buffers 218 and displaying such graphical data on the display device 170. The process begins at step 400 in which the screen refresh modules 240 of each back end unit requests data from each respective frame buffer 218 via respective resolvers 216. This preferably is timed by synchronizing each of the individual video timing generators 244.

The process then continues to step 402 in which the data retrieved by each of the slave back end units 238 is transmitted to the master RAMDAC 242. Unlike the master RAMDAC 242, in preferred embodiments, none of the slave RAMDACs 242 performs gamma correction or digital to analog conversion. Instead, each of the slave RAMDACs 242 merely retrieve their respective data and transmit such data to the master RAMDAC 242. In alternative embodiments, each of the slave back end units 238 transmits converted data.

As noted above, the slave RAMDACs 242 are configured to receive a timing signal from the phase locked loop 246, via the timing buffer 248, to synchronize data transmission to the master RAMDAC 242. The timing buffer 248 preferably is physically located on the accelerator in a position that minimizes signal propagation delays across the accelerator. In preferred embodiments, the timing buffer 248 is located nearest the slave back end units 238 that are physically located in the middle of each of the other back end units. In any event, each trace connected between the timing buffer 248 and each respective back end unit preferably has a substantially equal length to ensure a substantially identical propagation delay between such points. The combination of a timing buffer 248 and a phase locked loop 246 preferably is utilized instead of an external clock since a buffer is much less expensive. In alternative embodiments, an external clock may be used.

The process then continues to step 404 in which the master RAMDAC 242 processes all of the data received from the slave units 238 and its associated screen refresh module 240. Such processing preferably includes gamma correction (a/k/a gamma mapping, which is well known in the art), and digital to analog conversion for display on the (analog) display device 170. The processed data then is transmitted to the display device 170 in step 406, thus completing the process.

In preferred embodiments, the master RAMDAC 242 transmits one pixel of attribute data to the display device 170 during every clock cycle of a video clock. In a similar manner, each slave back end unit 238 also can transmit data for one pixel of attribute data every clock cycle to the master RAMDAC 242.

Figure 3A:
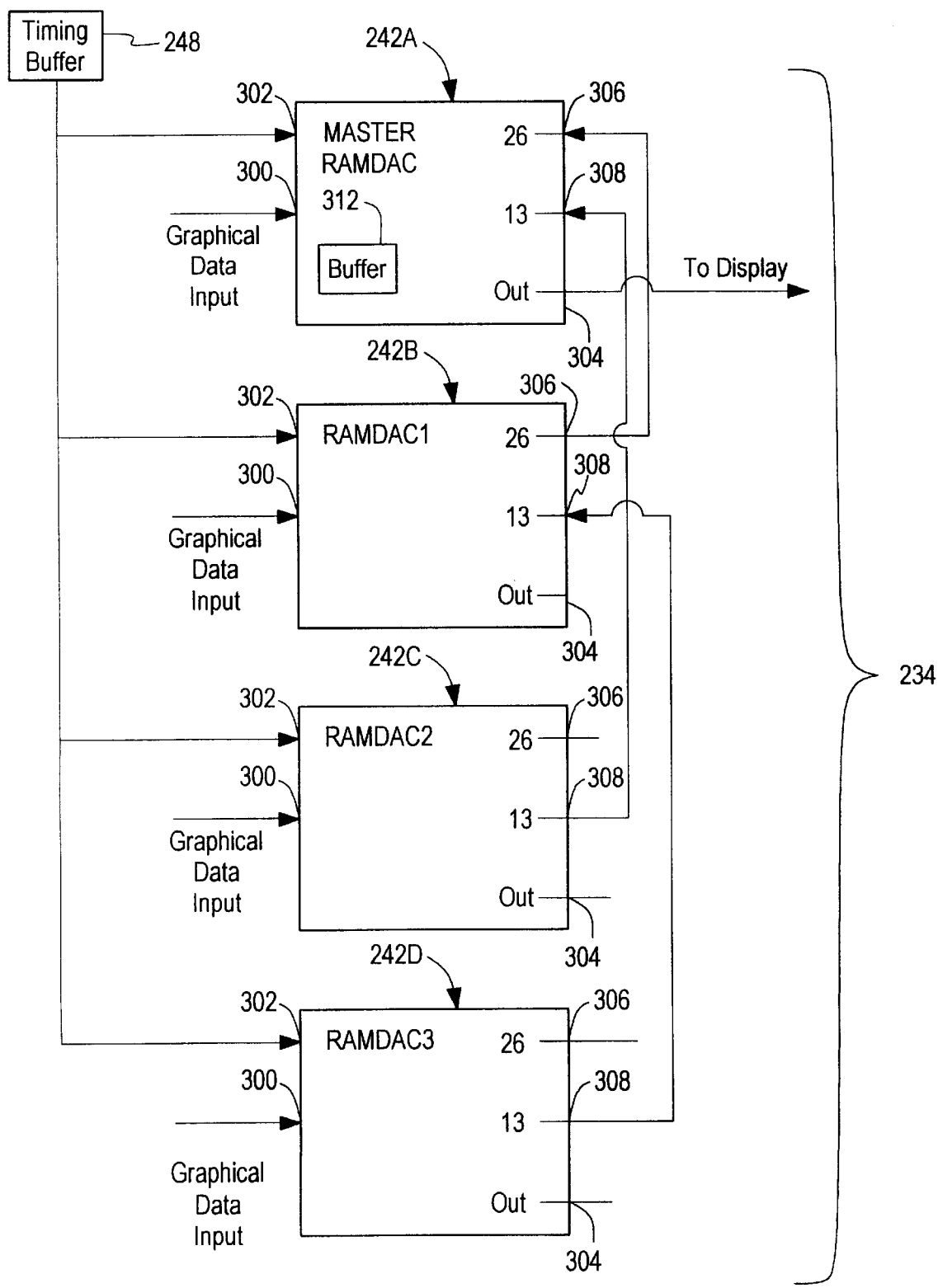
FIG. 3A schematically shows a preferred embodiment of a graphics accelerator with four back end units.

FIG. 3A shows the connections between four RAMDACs 242 within a four attribute processor graphics accelerator 200. These connections enable fractional amounts of data to be transmitted to the master RAMDAC 242 in a manner that reduces the total number of pins on each RAMDAC 242 (see below). As noted above, although each of the RAMDACs 242 preferably are structurally identical, configuration software controls them so that they each operate in a different manner based upon their role on the graphics accelerator 200. For example, only one of the RAMDACs 242 has the role of the master RAMDAC 242A, while the other RAMDACs 242 have the role of slave RAMDACs 242. The configuration software therefore sets the state of each RAMDAC 242 by assigning a role of each RAMDAC 242. Each RAMDAC 242 preferably includes a state input to receive state data.

Among other things, each RAMDAC 242 shown in FIG. 3A includes a graphical data input port 300 for receiving processed graphical data from the frame buffers 218 (via the resolvers 216 and screen refresh module 240), a timing input 302 for receiving a common timing signal from the timing buffer 248, two inter-processor data interfaces 306 and 308 for transmitting data to and/or from peer processors (i.e., peer RAMDACs 242), and a video data output port 304 for transmitting graphical data to the display device 170. As noted above, each RAMDAC 242 includes logic that may be used to further process the input graphical data. For example, each RAMDAC 242 includes logic to perform digital to analog conversion, and gamma correction. In addition, each RAMDAC 242 may have an associated buffer 312 (only shown on the master RAMDAC 242) for temporarily storing fractional pixel data (as shown below). This buffer 312 may be either internal or external to the RAMDACs 242 and/or attribute processors 314.

The inter-processor data interfaces include a twenty-six bit interface 306 and a thirteen bit interface 308 that can operate at different clock frequencies. More particularly, the twenty-six bit interface 306 may operate at a frequency that is two times faster than the rate of the thirteen bit interface 308. For example, the twenty-six bit interface 306 may operate at half the video clock rate, while the thirteen bit interface 308 may operate at a quarter of the video clock rate. In preferred embodiments, however, all inter-processor interfaces operate at the same speed, such as half of the video clock rate (referred to herein as the "common clock rate"). Moreover, in preferred embodiments, the video output port 304 operates at the video clock rate, which is twice the rate of the two interfaces.

Each pixel on the display device 170 preferably is represented by a twenty-six bit value. Accordingly, each attribute processor 314 delivers a twenty-six bit value to its back end unit 234 for each pixel in its set of pixels. The twenty-six bits include eight bits representing green, eight bits representing red, eight bits representing blue, and two palette selection bits to select data in a memory palette. Accordingly, in preferred embodiments, the twenty-six bit interface 306 includes twenty-six pins, while the thirteen bit interface 308 includes thirteen pins. Moreover, as noted above, each RAMDAC 242 produces pixel data (i.e., receives from its accompanying frame buffer 218) for different pixels on the display device 170.

Not all of the interfaces are utilized in preferred embodiments. In particular, in the four attribute processor configuration shown in FIG. 3A, the four RAMDACs 242 are considered to include a master RAMDAC 242A, a first RAMDAC 242B, and second RAMDAC 242C, and a third RAMDAC 242D, each of which has identical interfaces. In preferred embodiments, the thirteen bit interfaces 308 of the third RAMDAC 242D and the first RAMDAC 242B are coupled, the twenty-six bit interfaces 306 on the master RAMDAC 242A and first RAMDAC 242B are coupled, and the thirteen bit interfaces 308 of the second RAMDAC 242C and the master RAMDAC 242A are coupled. Although the twenty-six bit interfaces 306 on the second RAMDAC 242C and third RAMDAC 242D may be coupled, those interfaces are not utilized to transmit data in this configuration. In a similar manner, only the output of the master RAMDAC 242A is coupled to the display device 170.

During each clock cycle (of the common clock rate; i.e., half the video clock rate), each RAMDAC in FIG. 3A receives thirteen bits of data for a single pixel from its associated frame buffer 218. In addition, as detailed below, certain of the RAMDACs transmit data upstream toward the master RAMDAC 242A. Below is an illustration of the process utilized by the RAMDACs for producing and directing their pixel data to the master RAMDAC 242A, and eventually to the display device 170. The illustration is based upon the cycles of the common clock rate. It should be noted that the output port 304 operates at twice the common clock rate. Accordingly, during each of the clock cycles described below, the output port 304 transmits up to two twenty-six bit values for two pixels on the display device 170 (i.e., the output port 304 may perform two operations during each clock cycle).

Clock Cycle 1

Each RAMDAC 242 receives a first thirteen bits of data (hereinafter shortened to "thirteen bits") from respective frame buffers 218.

At the end of this cycle, each RAMDAC has the following data:

Master RAMDAC 242A: its first thirteen bits;
First RAMDAC 242B: its first thirteen bits;
Second RAMDAC 242C: its first thirteen bits; and
Third RAMDAC 242D: its first thirteen bits.

Clock Cycle 2

Each RAMDAC receives a second thirteen bits from respective frame buffers 218;

The first and second thirteen bits of the master RAMDAC 242A are combined and forwarded to the display via the output port 304.

The second RAMDAC 242C forwards its first thirteen bits to the master RAMDAC 242A via their thirteen bit interfaces 308; and The third RAMDAC 242D forwards its first thirteen bits to the first RAMDAC 242B via their thirteen bit interfaces 308;

At the end of this cycle, each RAMDAC has the following data:

Master RAMDAC 242A: first thirteen bits of the second RAMDAC 242C;
First RAMDAC 242B: first thirteen bits of the third RAMDAC 242D, and its first and second thirteen bits;
Second RAMDAC 242C: its second thirteen bits; and
Third RAMDAC 242D: its second thirteen bits.

Clock Cycle 3

Each RAMDAC receives a third thirteen bits from respective frame buffers 218.

The first RAMDAC 242B forwards its first and second thirteen bits to the master RAMDAC 242A via their respective twenty-six bit interfaces 306;

The master RAMDAC 242A combines and then forwards the first and second thirteen bits of the first RAMDAC 242B to the display device 170 via the output port 304;

The second RAMDAC 242C forwards its second thirteen bits to the master RAMDAC 242A;

After forwarding the data from the first RAMDAC 242B, the master RAMDAC 242A forwards the first and second thirteen bits of the second RAMDAC 242C to the display device 170 via the video data output port 304.

The third RAMDAC 242D forwards its second thirteen bits to the first RAMDAC 242B.

At the end of this cycle, each RAMDAC has the following data:

Master RAMDAC 242A: its third thirteen bits;
First RAMDAC 242B: the first and second thirteen bits of third RAMDAC, and its third thirteen bits;
Second RAMDAC 242C: its third thirteen bits; and
Third RAMDAC 242D: its third thirteen bits.

Clock Cycle 4

Each RAMDAC receives a forth thirteen bits from respective frame buffers 218;

The first RAMDAC 242B forwards the first and second thirteen bits of the third RAMDAC 242D to the master RAMDAC 242A via their twenty-six bit interfaces 306;

The master RAMDAC 242A combines and forwards the first and second thirteen bits of the third RAMDAC 242D to the display device 170 via the output port 304;

After the master RAMDAC 242A forwards the third RAMDAC data to the display device 170, the master RAMDAC 242A combines and forwards its third and forth thirteen bit data to the display device 170 via the output port 304;

The second RAMDAC 242C forwards its third thirteen bit data to the master RAMDAC 242A via their thirteen bit interfaces 308;

The third RAMDAC 242D forwards its third thirteen bit data to the first RAMDAC 242B via their thirteen bit interfaces 308.

At the end of this cycle, each RAMDAC has the following data:

Master RAMDAC 242A: the third thirteen bits of second the RAMDAC;
First RAMDAC 242B: its third and forth thirteen bits, and the third thirteen bits of the third RAMDAC 242D;
Second RAMDAC 242C: its forth thirteen bits; and
Third RAMDAC 242D: its forth thirteen bits.

Clock Cycle 5

Each RAMDAC receives fifth thirteen bits from respective frame buffers 218;

The first RAMDAC 242B3 forwards its third and forth thirteen bits to the master RAMDAC 242A via their twenty-six bit interfaces;

The master RAMDAC 242A combines and forwards the received first RAMDAC data to the display device 170;

The forth thirteen bits of the second RAMDAC 242C are forwarded to the master RAMDAC 242A;

After the master RAMDAC 242A forwards the received first RAMDAC data to the display device 170, the master RAMDAC 242A combines and forwards the received second RAMDAC data to the display device 170; and The forth thirteen bits of the third RAMDAC 242D are forwarded to the first RAMDAC 242B.

At the end of this cycle, each RAMDAC has the following data:

Master RAMDAC 242A: its fifth thirteen bits;
First RAMDAC 242B: the third and forth thirteen bits of the third RAMDAC 242D, and its fifth thirteen bits;
Second RAMDAC 242C: its fifth thirteen bits; and
Third RAMDAC 242D: its fifth thirteen bits.

The process continues in this manner for additional successive clock cycles until a graphical image is displayed on the display device 170. Those skilled in the art should appreciate the symmetry of the system shown in FIG. 3A and its continued operation past the fifth clock cycle.

Accordingly, as detailed in the above illustration, graphical data is forwarded to the display device 170 in a round robin manner from each RAMDAC (i.e., from each attribute processor 314). Moreover, forwarding data in this manner enables each RAMDAC (i.e., each attribute processor 314) to receive and/or forward the pixel data with a minimum number of pins. For example, in the graphics accelerator 200 of FIG. 3A, the two inter-processor interfaces 306 and 308 require thirty-nine pins only. This reduced number of pins significantly reduces space requirements for each attribute processor 314.

As a result of this process, during each clock cycle, the master RAMDAC 242A receives an amount of data from the other processors that is no larger than the product of the total number of other RAMDACs, and the amount of data received by each RAMDAC 242A–242H during each common clock cycle. In the illustration above, the master RAMDAC 242A receives no more than thirty-nine bits of data per common clock cycle (i.e., three times thirteen). The graphics accelerator 200 nevertheless should operate properly even though such a small amount of data is received by the master RAMDAC 242A per common clock cycle.

Figure 3B:
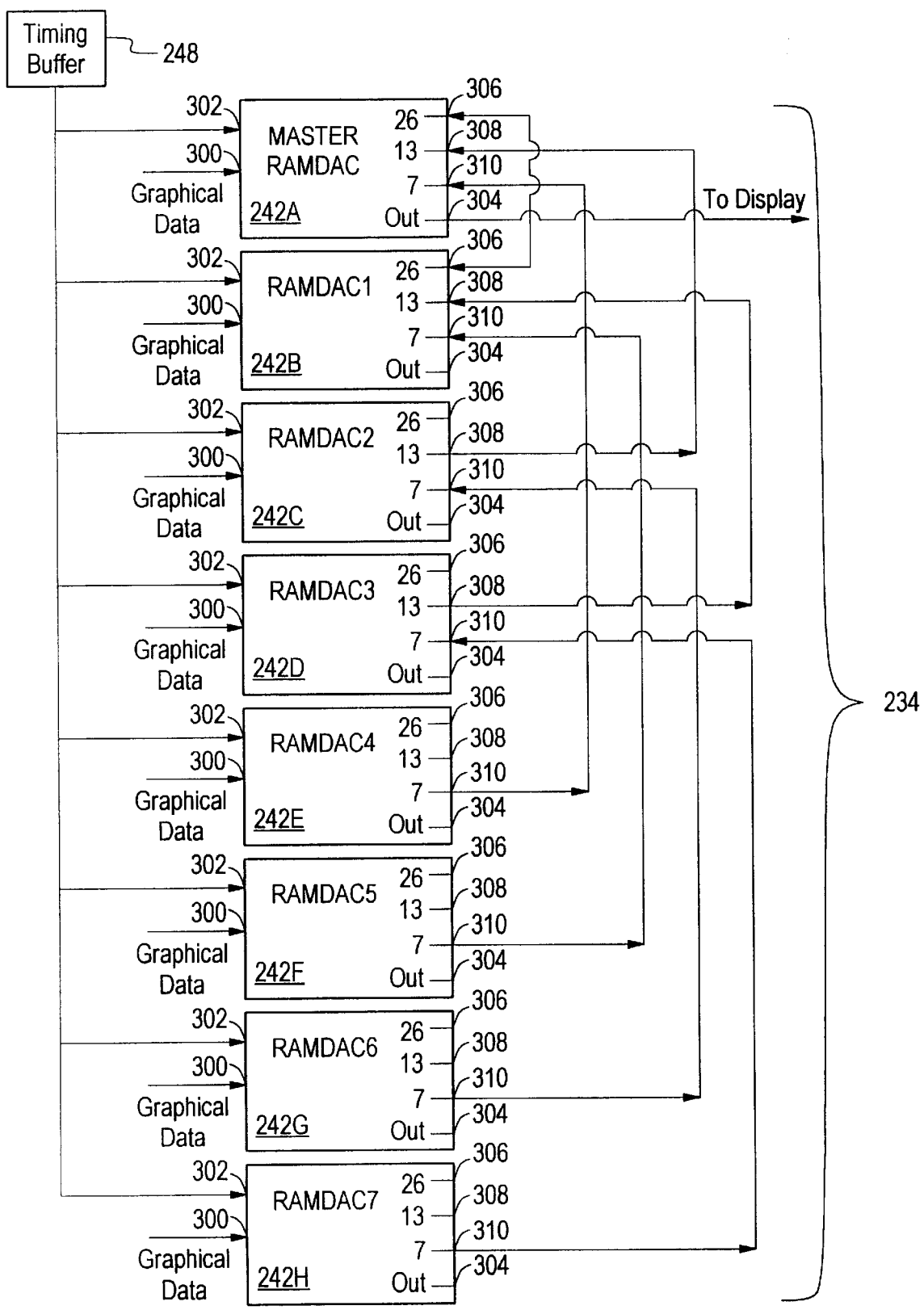
FIG. 3B schematically shows a preferred embodiment of a graphics accelerator with eight back end units.

Preferred embodiments of the invention may be applied to graphics accelerators 200 having more RAMDACs. FIG. 3B shows a graphics accelerator 200 with eight attribute processors 314. Accordingly, in addition to the RAMDACs 242 shown in FIG. 3A, the graphics accelerator 200 of FIG. 3B respectively shows forth through seventh RAMDACs 242E, 242F, 242G, and 242H. In addition to the elements shown in RAMDACs in FIG. 3A, each RAMDAC in FIG. 3B also includes a seven bit interface 310 for transmitting data to or receiving data from other peer RAMDACs. The seven bit interface 310 is substantially half the size of the thirteen bit interface 308. More specifically, the seven bit interface 310 is the rounded up quotient of half the size of the thirteen bit interface 308. The size of the seven bit interface 310 therefore was selected by dividing the size of the thirteen bit interface 308 by two to yield 6.5, and then rounding that number up to produce the number seven. As used herein, a first number is considered to be "substantially two times as large" or "substantially two times the size" as a second number when the first number is in fact two times as large as the second number, or one less than two times the second number. For example, thirteen is considered to be substantially two times as large as seven.

The size of each interface on a RAMDAC preferably is selected relative to the size of the data being processed, and the other interfaces. The size of the largest interface (the "first interface") preferably is the size of the graphical data being processed. In the example above, the graphical data is twenty-six bits wide and thus, the first interface is twenty-six bits wide. The size of the next successive interface (the "second interface") thus is the rounded up quotient of half the size of the largest interface. Again, in the example above, the second interface is thirteen bits wide. The size of the third interface thus is the rounded up quotient of the second interface (i.e., seven bits wide). This process of selecting the interface sizes continues to the smallest interface. Of course, preferred embodiments of the invention are applicable to RAMDACs that process pixel data that is not twenty-six bits wide.

The RAMDACs shown in FIG. 3B therefore operate in a manner that is similar to the manner utilized by the RAMDACs shown in FIG. 3A. In this embodiment, the master RAMDAC 242A, first RAMDAC 242B, second RAMDAC 242C, and third RAMDAC 242D are coupled together identically to those corresponding RAMDACs in FIG. 3A. In addition, the forth and the master RAMDAC 242As are coupled via their seven bit interfaces 310, the fifth and first RAMDACs 242F and 242B are coupled via their seven bit interfaces 310, the sixth and second RAMDACs 242G and 242C are coupled via their seven bit interfaces 310, and the seventh and third RAMDACs 242H and 242D are coupled via their seven bit interfaces 310. Each RAMDAC receives seven bits of data during each common clock cycle, and processes the data in a similar manner to that of the embodiment shown in FIG. 3A.

In some embodiments, the interfaces that are not utilized are coupled in the event that additional or fewer RAMDACs are to be utilized to illuminate the pixels on the display device 170. To that end, in the embodiment of FIG. 3B, the twenty-six bit interfaces 306 of the second and third RAMDACs 242C and 242D are coupled, the twenty-six bit interfaces 306 of the forth and fifth RAMDACs 242E and 242F are coupled, and the twenty-six bit interfaces 306 of the sixth and seventh RAMDACs 242G and 242H are coupled. In addition, the thirteen bit interfaces 308 of the forth and sixth RAMDACs 242E and 242G are coupled, and the thirteen bit interfaces 308 of the fifth and seventh RAMDACs 242F and 242H are coupled.

In preferred embodiments, the plurality of back end units may be utilized to display data across two or more display devices. This may be useful, for example, when an image may be enlarged or dragged across display devices. In such case, an application program delivers instructions to the graphics accelerator 200 indicating that an image is to be displayed across two displays. The plurality of back end units then divides up into the number of display devices to be utilized. For example, if two displays are to be utilized, then the back end units divide the back end into two sets of back end units (i.e., two sets of RAMDACs). Each of the two sets includes a master back end unit 236 (i.e., master RAMDAC 242A). Processing then continues in accord with preferred embodiments of the invention. The two sets of back end units thus are utilized to display the image over the two display devices.

Accompanying driver software (i.e., configuration software to set the state as noted above) preferably is utilized to enable additional attribute processors 314 to be physically or logically added or removed from the graphics accelerator 200. Accordingly, the graphics accelerator 200 may be operated with one graphics processor (i.e., "single mode") or with more than one graphics processor (i.e., "multiple mode"). In preferred embodiments, the driver software includes a graphical user interface ("GUI," not shown) for configuring the graphics accelerator 200. Among other things, the GUI may include a field for entering the total number of attribute processors 314 in the system. Data thus is processed by the graphics accelerator 200 based upon the total number of attribute processors 314 in the system.

Additional details of the operation of the geometry accelerator discussed above are disclosed in copending U.S. patent application entitled, "MULTI-PROCESSOR GRAPHICS ACCELERATOR", filed on even date herewith, assigned to Intergraph Corporation, and bearing attorney docket number 1247/A22, the disclosure of which is incorporated herein, in its entirety, by reference.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

We claim:

1. A method of directing graphical data toward a display device from a plurality of graphics processors, each graphics processor having an associated set of pixels on the display device, each graphics processor producing graphical data for its respective set of pixels, the graphics processors utilizing a common clock frequency, each pixel being represented by a first amount of graphical data, the method comprising:
designating one of the graphics processors to be a destination processor, the total number of graphics processors that are not designated as the destination processor being a remaining number;
controlling each graphics processor to produce a second amount of graphical data during each clock cycle of the common clock, the first amount of graphical data being comprised of at least substantially two times the second amount of graphical data; and
coupling the graphics processors so that during each clock cycle, the destination processor receives no more graphical data from the other processors than an amount equal to the product of the remaining number and the second amount.

2. The method as defined by claim 1 wherein the first amount of graphical data is a multiple of the second amount of graphical data.

3. The method as defined by claim 1 wherein the first amount is an odd number, the second amount being calculated by rounding up the quotient of the first amount divided by two.

4. The method as defined by claim 1 wherein the second amount is a rounded up half of an intermediate amount between the first amount and the second amount, the intermediate amount being a rounded up half of the first amount.

5. The method as defined by claim 4 wherein the second amount is a rounded up half of the intermediate amount.

6. The method as defined by claim 1 wherein the second amount is a rounded up half of one of a plurality of intermediate amounts between the first amount and the second amount.

7. The method as defined by claim 1 wherein the remaining number of graphics processors equals three.

8. The method as defined by claim 7 wherein the first amount of graphical data is twenty-six bits wide.

9. The method as defined by claim 1 wherein the remaining number of graphics processors equals seven.

10. The method as defined by claim 9 wherein the first amount of graphical data is twenty-six bits wide.

11. The method as defined by claim 1 wherein the first amount of graphical data includes color and transparency data.

12. The method as defined by claim 1 wherein data representing a set number of pixels is received by the destination processor after every selected number of clock cycles, the set number of pixels being equal to the remaining number.

13. The method as defined by claim 1 wherein a given graphics processor transmits given graphical data toward the destination processor, the given graphical data including graphical data for a pixel in a set of pixels that is not associated with the given graphics processor.

14. The method as defined by claim 1 further comprising:
buffering all pixel data received by the destination graphics processor.

15. The method as defined by claim 14 wherein the pixel data is buffered in a buffer, the method further comprising:
forwarding all complete pixel data from the buffer to the display device.

16. The method as defined by claim 1 wherein the graphics processors are rasterizers.

17. The method as defined by claim 1 wherein only fractional amounts of graphical data for pixels are received by the destination processor during each clock cycle.

18. The method as defined by claim 1 wherein during each clock cycle, the destination processor receives fractional amounts of graphical data for a total number of pixels equaling the remaining number.

19. A graphics accelerator for directing graphical data toward a display device from a plurality of coupled graphics processors, each graphics processor having an associated set of pixels on the display device, each graphics processor producing graphical data for its respective set of pixels, each set of pixels having no pixels that are members of other sets of pixels, the graphics processors utilizing a common clock frequency, each pixel being represented by a first amount of graphical data, the graphics accelerator comprising:
a processor designator that designates one of the graphics processors to be a destination processor, the total number of graphics processors that are not designated as the destination processor being a remaining number;
a controller that causes each graphics processor to produce a second amount of graphical data during each clock cycle of the common clock, the first amount of graphical data being comprised of at least two of the second amounts of graphical data; and
a data transmitter that causes the destination processor to receive, during each clock cycle, no more graphical data from the other processors than an amount equal to the product of the remaining number and the second amount.

20. The graphics accelerator as defined by claim 19 further comprising:

a buffer that stores graphical data received by the destination processor.

21. The graphics accelerator as defined by claim 20 further comprising:

a transmitter that transmits graphical data from the buffer to the display device.

22. The graphics accelerator as defined by claim 19 wherein the graphics processors include a rasterizer.

23. The graphics accelerator as defined by claim 19 wherein only fractional amounts of graphical data for pixels are received by the destination processor during each clock cycle.

24. The graphics accelerator as defined by claim 19 wherein during each clock cycle, the destination processor receives fractional amounts of graphical data for a total number of pixels equaling the remaining number.

25. A computer program product for use on a computer system for directing graphical data toward a display device from a plurality of graphics processors, each graphics processor having an associated set of pixels on the display device, each graphics processor producing graphical data for its respective set of pixels, each set of pixels having no pixels that are members of other sets of pixels, the graphics processors utilizing a common clock frequency, each pixel being represented by a first amount of graphical data, the computer program product comprising a computer usable medium having a computer readable program code thereon, the computer readable program code comprising:

program code for designating one of the graphics processors to be a destination processor, the total number of graphics processors that are not designated as the destination processor being a remaining number;

program code for controlling each graphics processor to produce a second amount of graphical data during each clock cycle of the common clock, the first amount of graphical data being comprised of at least two of the second amounts of graphical data; and program code for forwarding to the destination processor, during each clock cycle, no more graphical data from the other processors than an amount equal to the product of the remaining number and the second amount.

26. The computer program product as defined by claim 25 further comprising:

program code for storing graphical data received by the destination processor.

27. The computer program product as defined by claim 26 further comprising:

program code for transmitting graphical data to the display device.

28. The computer program product as defined by claim 25 wherein the graphics processors include a rasterizer.

29. The computer program product as defined by claim 25 wherein only fractional amounts of graphical data for pixels are received by the destination processor during each clock cycle.

30. A graphics accelerator for processing graphical data for display on a display device having a plurality of pixels, each pixel being represented by a first amount of graphical data, the graphics accelerator comprising:

a fixed number of graphics processors operating in accord with a common clock frequency, each graphics processor having an associated set of pixels on the display device, each graphics processor producing graphical data for its respective set of pixels, each graphics processor producing a second amount of graphical data during each clock cycle, one of the graphics processors being designated a destination processor; and coupling circuitry that couples the plurality of processors in a manner that causes the destination processor to receive, during each clock cycle, no more graphical data from the other graphics processors than an amount equal to the product of the second amount and one less than the fixed number, only fractional amounts of graphical data for pixels being received by the destination processor during each clock cycle, the first amount of data comprising at least substantially two times the second amount of data.

31. The graphics accelerator as defined by claim 30 wherein each graphics processor includes first and second graphical data ports that each interface with graphical data either transmitted to or received from other graphics processors, the second graphical data port having a size that is equal to or less than the second amount of data, the first graphical data port having a size that is substantially two times the size of the second graphical data port.

32. The graphics accelerator as defined by claim 31 wherein each graphics processor includes a third graphical data port that interfaces with graphical data either transmitted to or received from the other graphics processors, the third graphical data port having a size that is substantially two times the size of the first graphical data port.

33. The graphics accelerator as defined by claim 32 wherein the third graphical data port on the destination processor receives graphics data for twice as many pixels as is received by its first graphical data port.

34. A graphics processor that processes graphical data for display on a display device, the display device having a plurality of pixels that each are represented by a first amount of graphical data, the graphics processor comprising:

a state input that receives state data identifying the number of other graphics processors being utilized with the graphics processor, the graphics processor operating in a single state when the state data indicates that the graphics processor is operating with no other graphics processors, the graphics processor operating in a multiple state when the state data indicates that the graphics processor is operating with at least one other graphics processor;

a pixel processor that produces a second amount of graphical data during each clock cycle of a reference clock, the first amount of graphical data being comprised of at least substantially two times the second amount of graphical data when in the multiple state; and first and second graphical data ports that each interface with graphical data either transmitted to or received from other graphics processors when in the multiple state, the second graphical data port having a size that is equal to or less than the second amount of graphical data, the first graphical data port having a size that is substantially two times the size of the second graphical data port.

35. The graphics processor as defined by claim 34 further comprising:

a timing input that receives the timing signal from the reference clock.

36. The graphics processor as defined by claim 35 wherein the reference clock is internal to the graphics processor.

37. The graphics processor as defined by claim 35 wherein the reference clock is external to the graphics processor.

38. The graphics processor as defined by claim 34 further comprising:
a third graphical data port that interfaces with graphical data either transmitted to or received from other graphics processors when in the multiple state, the third graphical data port being substantially two times the size of the first graphical data port.

39. The graphics processor as defined by claim 38 wherein the third graphical data port is twenty-six bits wide, the first graphical data port is thirteen bits wide, and the second graphical data port is seven bits wide.

40. The graphics processor as defined by claim 39 wherein the first amount of graphical data is twenty-six bits wide and the second amount of graphical data is seven bits wide.

41. The graphics processor as defined by claim 34 wherein the first graphical data port has a first set of pins, the second graphical data port having a second set of pins, the first and second sets of pins having no common pins, the first set of pins having substantially two times more pins than in the second set of pins.

42. The graphics processor as defined by claim 34 further comprising:
a graphical data output port for transmitting graphical data to the display device, the graphical data having the first amount of data for each pixel being illuminated.

43. The graphics processor as defined by claim 34 wherein the first amount of graphical data is twenty-six bits wide and the second amount of graphical data is thirteen bits wide.

44. The graphics processor as defined by claim 34 wherein during the multiple state, only fractional amounts of graphical data for pixels are received by the processor from other processors during each clock cycle.

45. The graphics processor as defined by claim 34 wherein the first graphical data port interfaces graphical data for two times as many pixels as is interfaced by the second graphical data port.

46. A graphics processor that processes graphical data for display on a display device, the display device having a plurality of pixels, the graphics processor comprising:

a state module that maintains the state of the graphics processor, the graphics processor operating in a single state when operating with no other graphics processors, the graphics processor operating in a multiple state when operating with at least one other graphics processor;

a pixel processor that produces a fractional amount of graphical pixel data during each clock cycle of a reference clock when in the multiple state;

a plurality of graphical data ports that each interface with corresponding graphical data ports on other graphics processors when in the multiple state;

each of the plurality of graphical data ports having a different size and each interfacing fractional graphical data only, the fractional data being received during each clock cycle.

47. The graphics processor as defined by claim 46 wherein the fractional amount of graphical pixel data is the same size as a first of the plurality of graphical data ports, the first graphical data port interfacing fractional pixel data for one pixel during each clock cycle.

48. The graphics processor as defined by claim 47 wherein a second of the plurality of graphical data ports is substantially twice as large as the first of the plurality of graphical data ports, the second of the plurality of graphical data ports interfacing fractional pixel data for two pixels on the display device during each clock cycle.

49. The graphics processor as defined by claim 48 wherein a third of the plurality of graphical data ports is substantially twice as large as the second of the plurality of graphical data ports, the third of the plurality of graphical data ports interfacing fractional pixel data for four pixels on the display device during each clock cycle.

50. The graphics processor as defined by claim 46 further comprising a data output port for directing graphical pixel data to a display device, the data output port operating at a frequency that is greater than the frequency produced by the reference clock.

51. The graphics processor as defined by claim 50 wherein the data output port operates at about two times the frequency produced by the reference clock.

* * * * *